United States Patent
Hernandez

(10) Patent No.: US 9,314,390 B2
(45) Date of Patent: Apr. 19, 2016

(54) TATTOO ARM REST

(71) Applicant: Marco Hernandez, Olympia, WA (US)

(72) Inventor: Marco Hernandez, Olympia, WA (US)

( * ) Notice: Subject to any disclaimer, the term of this patent is extended or adjusted under 35 U.S.C. 154(b) by 0 days.

(21) Appl. No.: 14/663,269

(22) Filed: Mar. 19, 2015

(65) Prior Publication Data

US 2015/0265485 A1 Sep. 24, 2015

Related U.S. Application Data

(60) Provisional application No. 61/954,999, filed on Mar. 18, 2014.

(51) Int. Cl.
| | | |
|---|---|---|
| *F16M 11/00* | (2006.01) | |
| *A61G 13/12* | (2006.01) | |
| *F16M 11/14* | (2006.01) | |
| *F16M 11/28* | (2006.01) | |
| *B67B 7/16* | (2006.01) | |

(52) U.S. Cl.
CPC ............ *A61G 13/1235* (2013.01); *B67B 7/16* (2013.01); *F16M 11/14* (2013.01); *F16M 11/28* (2013.01)

(58) Field of Classification Search
USPC ............ 248/118, 118.1, 118.3, 125.8, 125.9, 248/121, 181.1, 181.2, 177.1, 178.1
See application file for complete search history.

(56) References Cited

U.S. PATENT DOCUMENTS

| | | | | |
|---|---|---|---|---|
| 3,929,309 | A * | 12/1975 | DeVore .................. | A47C 1/06 248/118 |
| 4,997,054 | A * | 3/1991 | Denny ................. | B60N 2/4633 180/331 |
| 5,797,655 | A * | 8/1998 | Miles ..................... | A47C 7/546 248/118 |
| 7,044,267 | B2 * | 5/2006 | Sigler .................... | A47C 16/00 182/116 |
| 8,020,829 | B1 * | 9/2011 | Tamayori ............... | F16M 11/14 108/144.11 |
| D728,800 | S * | 5/2015 | Klein ........................... | D24/184 |
| 2007/0007400 | A1 * | 1/2007 | James ..................... | A61G 7/05 248/125.1 |
| 2009/0250565 | A1 * | 10/2009 | Jaggers .................. | A61G 13/12 248/125.8 |

\* cited by examiner

*Primary Examiner* — Steven Marsh
(74) *Attorney, Agent, or Firm* — George A. Leone; Citadel Patent Law

(57) ABSTRACT

A tattoo arm rest includes an arm pad, a ball swivel coupled to the arm pad, a rectangular stem support coupled to the ball swivel, a corner pinch vise having a locking member located to lock the rectangular stem support vertically in place. A rectangular vertical support column is sized to slidingly receive the stem support, wherein the rectangular vertical support column and rectangular stem support are substantially telescoping rectangular tubes, wherein the rectangular vertical support column has a support block affixed thereto with a hole for accepting the corner pinch vise locking bolt. A foot rest is affixed proximate the bottom of the vertical support column. Support legs are configured in a tripod arrangement and attached to the vertical support column.

12 Claims, 7 Drawing Sheets

TATTOO ARM REST

CROSS REFERENCE TO RELATED APPLICATIONS

This application claims priority to U.S. Provisional Application No. 61/954,999 filed Mar. 18, 2014, which is hereby incorporated by reference.

TECHNICAL FIELD

The present invention relates to equipment used in applying tattoos in general, and, more particularly, to a tattoo arm rest with an attached footrest.

BACKGROUND

There have been several attempts in the past to address the problems associated with tattoo arm rests. During the process of applying a tattoo, the person receiving the tattoo must typically rest his/her arm in a position allowing the tattoo artist complete and comfortable access to the area being tattooed. Applying a tattoo necessarily involves a degree of pain to the person being tattooed. As a result, the recipient may bear down heavily on a provided armrest often causing the armrest to move or slip down. Obviously this is not desirable since it may cause errors due to slips of the artists tattoo pen.

Currently available devices are either limited by incrementally positioned locking mechanisms or, alternatively, by using collapsible and expandable tube elements which have a tendency to slip during use. While pinch vise devices are known, they are typically applied to a flat surface of a tube by drilling a hole through the flat surface and welding a supporting collar such as a nut or the like to the flat surface. This has been proven to be unreliable for holding the arm rest in position when any substantial downward force is applied to the arm rest (as often happens due to the pain involved in the process). Thus, in such prior art devices, the height adjustment is restricted to predetermined increments set by locking elements or detents and cannot be finely adjusted to any desirable height.

Further, the process of applying a tattoo itself is often tiresome requiring the artist to uncomfortably assume various positions in order to best access the area to which the tattoo is being applied. It would be advantageous for the tattoo artist to be able to have a stable foot rest in order to be able to comfortably support the foot to reduce stress while working by alleviating back strain. Armrest devices currently available do not provide for such a stable foot rest or a reliable, finely adjustable vertical height locking device.

The present disclosure provides new and novel solutions to overcome problems inherent in the prior art by, for the first time, providing a locked, stable, and finely adjustable armrest integrated with a stable foot rest.

BRIEF SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment a tattoo arm rest includes an arm pad, a ball swivel coupled to the arm pad, wherein the arm pad is mounted on a plate having a collar thereon for accepting the ball swivel. A rectangular stem support is coupled to the ball swivel. A rectangular vertical support column sized to slidingly receive the stem support, wherein the rectangular vertical support column and rectangular stem support are substantially telescoping rectangular tubes. A corner pinch vise has a locking bolt located to lock the rectangular stem support vertically in place. The locking bolt impinges upon the rectangular stem support through a collar block having a V-shaped groove on one end for mating with a corner of the rectangular vertical support column so as to allow the armrest to be finely positioned. The block is welded or integrated into the rectangular vertical support column and the rectangular vertical support column is sized to slidingly receive the stem support.

In another aspect, the rectangular vertical support column and rectangular stem support are substantially rectangular tubes, wherein the rectangular vertical support column has a wedge-shaped support affixed to a corner thereto with a hole for accepting the corner pinch vise locking bolt.

In another aspect, a bottle opener may advantageously be affixed to the vertical support column, and the foot rest may be advantageously affixed proximate the bottom of the vertical support column. In one example, the foot rest is attached to the rectangular vertical support column by a substantially perpendicular horizontal support member wherein the footrest includes a non-slip top surface, and a plurality of support legs configured in a tripod arrangement and attached to the vertical support column.

Other benefits and advantages of the present invention will become apparent from the disclosure, claims and drawings herein.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

Figure 1:
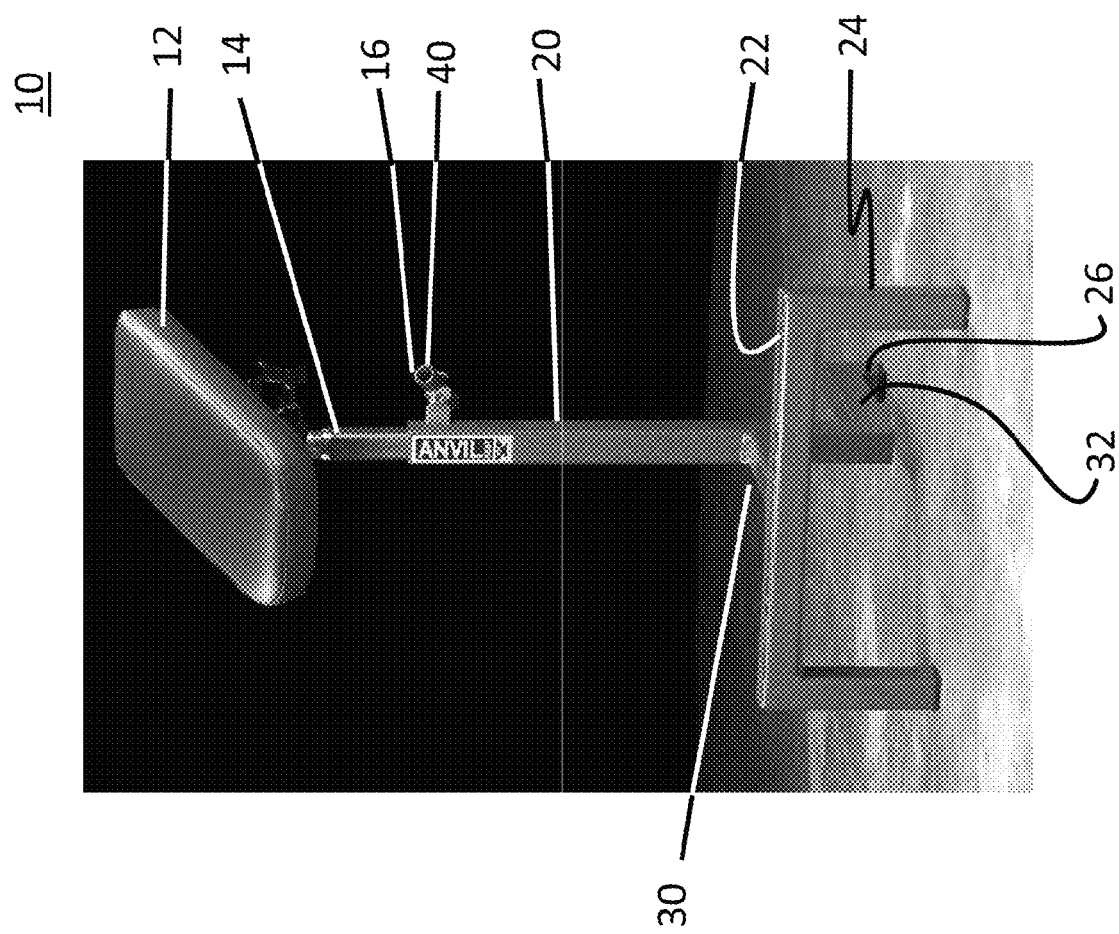
FIG. 1 is a view of an example of a tattoo arm rest showing the overall tripod design with an integrated foot rest.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes several embodiments and systems for a tattoo arm rest. Several features of methods and systems in accordance with example embodiments are set forth and described in the Figures. It will be appreciated that methods and systems in accordance with other example embodiments can include additional procedures or features different than those shown in the Figures. Example embodiments are described herein with respect to an adjustable arm rest with a corner pinch vise. However, it will be understood that these examples are for the purpose of illustrating the principles, and that the invention is not so limited. Additionally, methods and systems in accordance with several example embodiments may not include all of the features shown in the Figures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or various combinations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Referring now to FIG. 1, a view of an example of a tattoo arm rest showing the overall tripod design with an integrated foot rest is shown. A tattoo arm rest 10 includes an arm pad 12, a rectangular stem support 14, and a corner pinch vise 16, a rectangular vertical support column 20, a foot rest 22 and support legs 24. In one example, the foot rest 22 is attached to the rectangular vertical support column 20 by horizontal support member 30. A second horizontal support member 32 connects a third leg 26 to the rectangular vertical support column 20. The pair of opposing legs 24 and the third leg 26 are arranged to support the tattoo armrest 10 in a tripod configuration.

Figure 2:
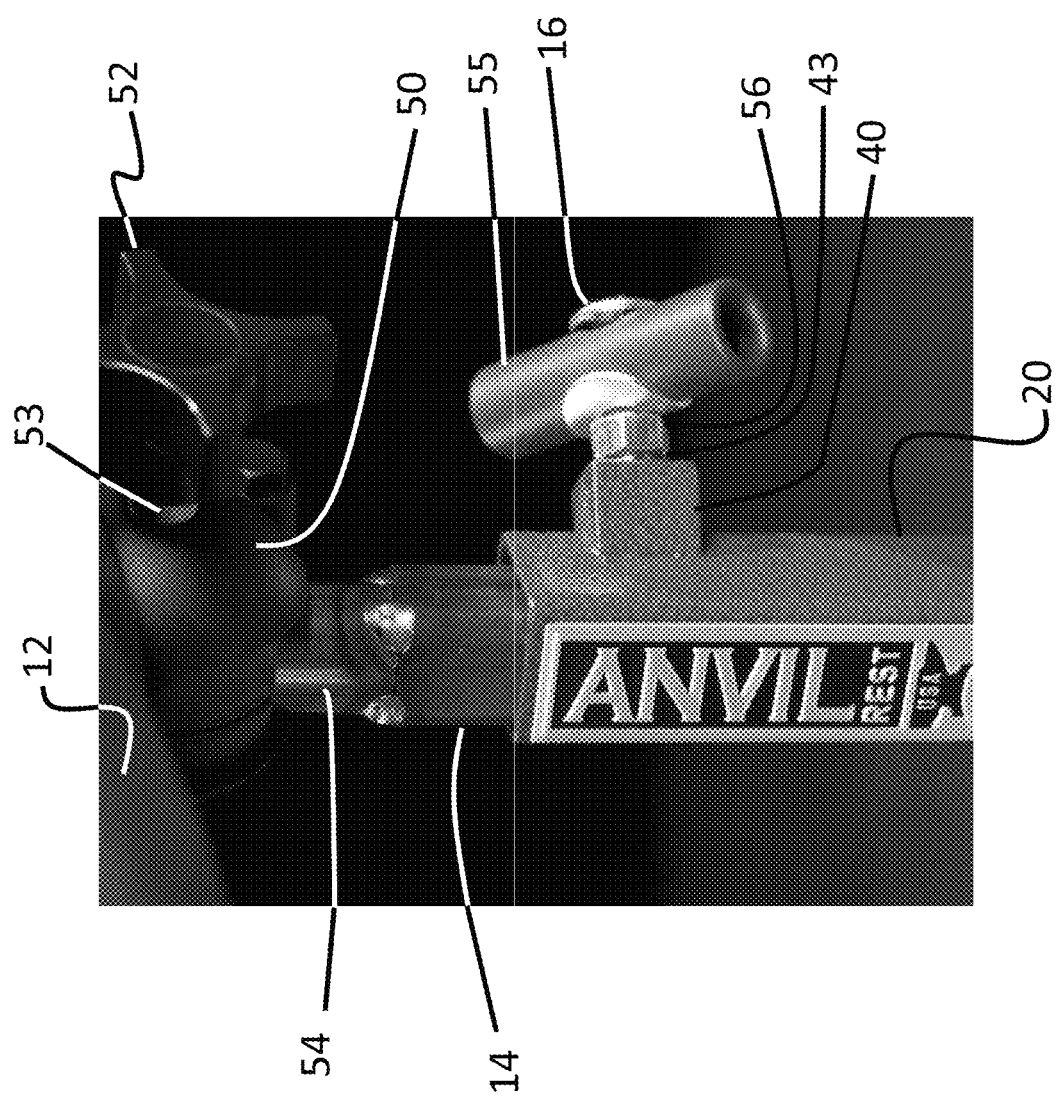
FIG. 2 is a more detailed view of a corner pinch vise and ball swivel as employed in one example of a tattoo arm rest.

Referring now to FIG. 2, a more detailed view of a corner pinch vise and ball swivel as employed in one example of a tattoo arm rest is shown. Attached to the bottom of the arm pad 12 is a ball swivel assembly 50. The ball swivel assembly 50 is mounted on a short ball support element 54 which includes a (not shown) mating ball which mates with the ball swivel assembly 50. A knob 52 having a threaded locking bolt 53 is used to listen and tighten the ball swivel 50. In this way, the ball swivel 50 connected to the arm pad 12 allows the arm pad 12 to be adjusted for a full range of motion in three dimensions including spin, tilt and pan. The arm pad can be rotated 360 degrees and locked securely in place. Those skilled in the art will appreciate how to connect the ball swivel 52 to the arm pad 12 in a conventional manner.

Focusing attention now on the pinch vise 16, it includes a handle 55, a spacer, such as for example, a nut 56, and a threaded locking bolt 43. A block collar 40 is welded onto the rectangular stem support 14 and has a threaded channel for mating with the bolt 43. The threaded channel allows the threaded locking bolt 43 to be screwed into the rectangular vertical support column 20 in order to pinch and hold a corner of the rectangular stem support 14. The vertical support column 20 and stem support 14 are substantially rectangular or square telescoping elongated tubes which are sized so as to allow the rectangular stem support 14 to slide snugly into the rectangular vertical support column 22. By sliding the stem support 14 upwards or downwards inside the support column, the arm pad 12 can be vertically positioned at a desired height. When the desired height is selected, the handle 55 on the pinch vise 16 is used to tighten the corner pinch vise driving the threaded locking bolt 43 through the threaded channel in the collar 42 tightly hold the rectangular stem support 14 in position.

Figure 3:
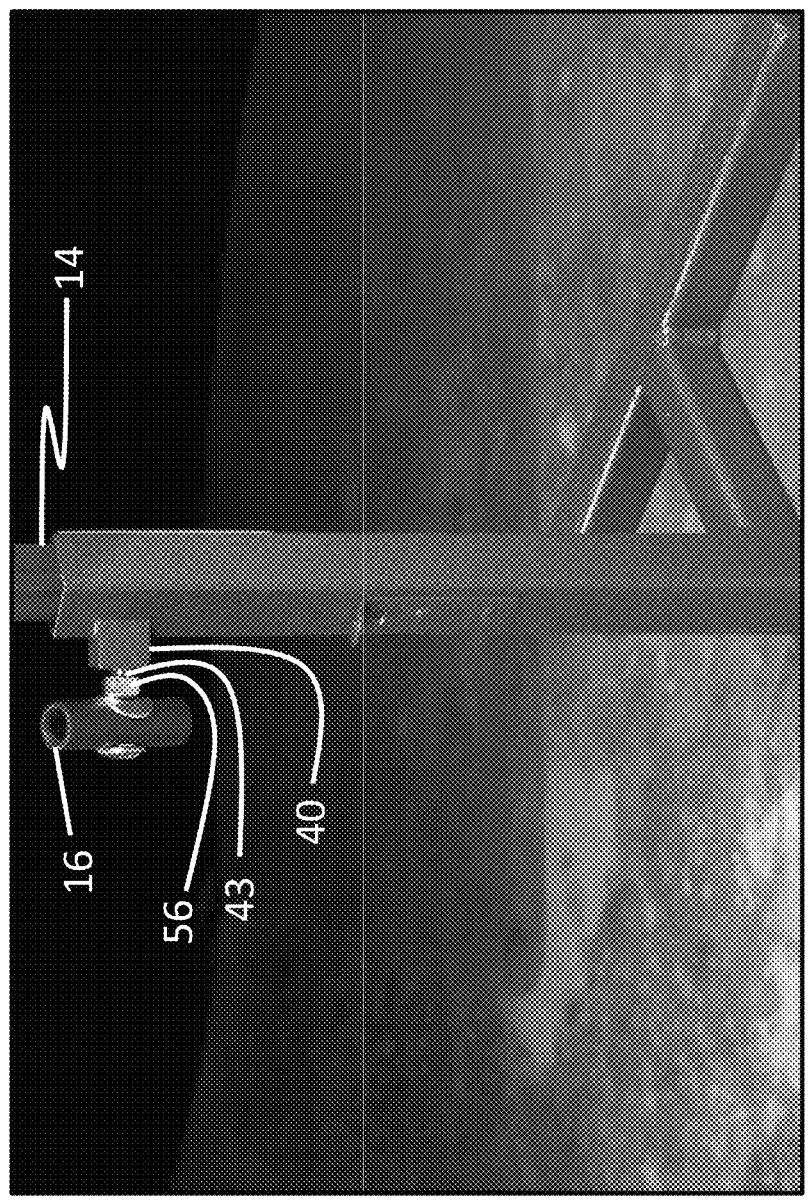
FIG. 3 is another view of the corner pinch vise engaging an adjustable center vertical support insert.

Referring now to FIG. 3, another view of the corner pinch vise engaging an adjustable center vertical support insert is shown. In this view the threaded locking bolt 43 which impinges upon the rectangular stem support 14 is more clearly shown. The collar 40 may advantageously be fabricated from a square block of metal or an equivalent material having a V shaped groove on one end for mating with the corner of the rectangular vertical support column 20 at a height convenient for hand tightening. The collar 40 may be welded or otherwise affixed or integrated into the rectangular vertical support column 20. Since there are no detents, notches or other fixed locking mechanisms the height of the armrest may be finely positioned and to any convenient height. Thus, unlike prior art devices, the height adjustment is not restricted to predetermined increments.

Because the vice pinches on the corner of the inner stem support tube it exhibits superior and unexpected locking force. One example embodiment built in Olympia, Wash. by Marco Hernandez includes a built-in footrest, to help alleviate back strain, employs a modified tripod design which is the most compatible design for any customer/tattoo chair combination. Height adjustment vise has been tested to hold upwards of 300 lbs by merely hand tightening. The pad positioning ball joint is substantially infinitely versatile, allowing for full range of motion including spin, tilt and pan. When knob is finger tightened the 6"×12" pad is rock solid and stable.

Figure 4:
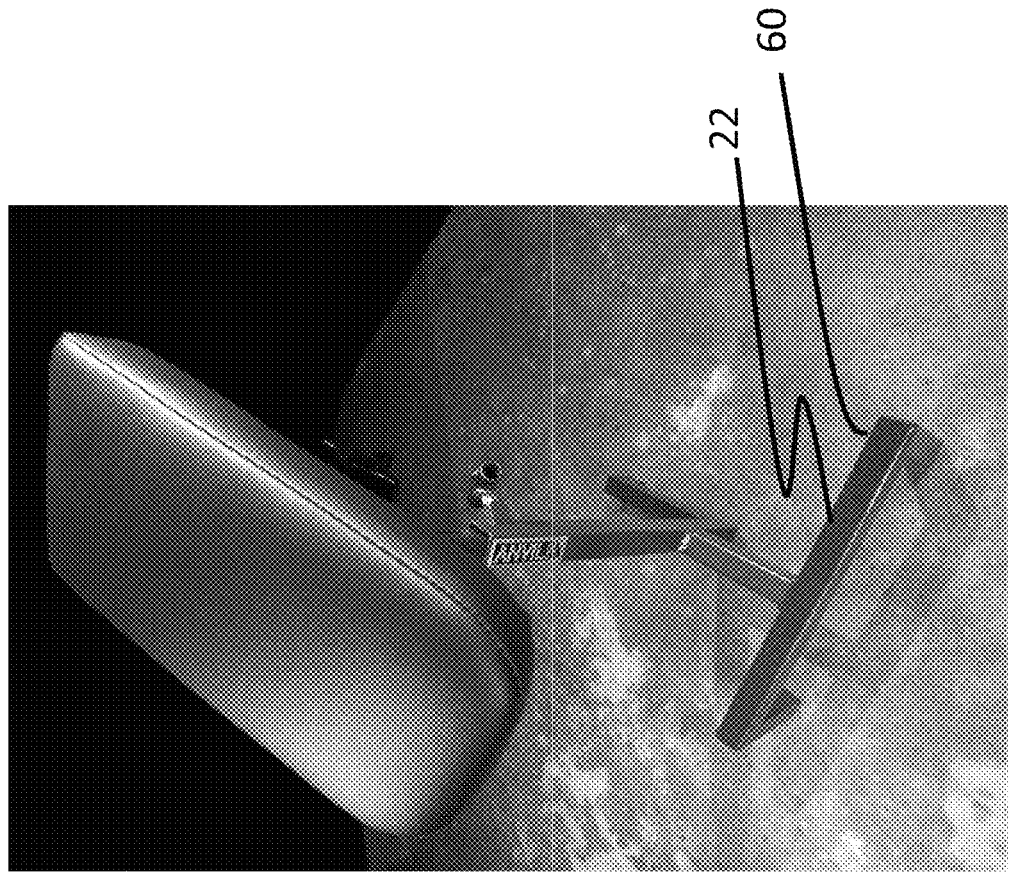
FIG. 4 is a top view of one example of a tattoo arm rest.

Referring now to FIG. 4, a top view of one example of a tattoo arm rest is shown. Here it can be seen that the foot rest 22 includes a top surface upon which a non-slip pad 60 or other surface treatment can be affixed or applied. In this way a tattoo artist can easily rest his/her foot during the long process of applying a tattoo without the need for using a separate stool or other detached foot rest which can easily slip.

Figure 5:
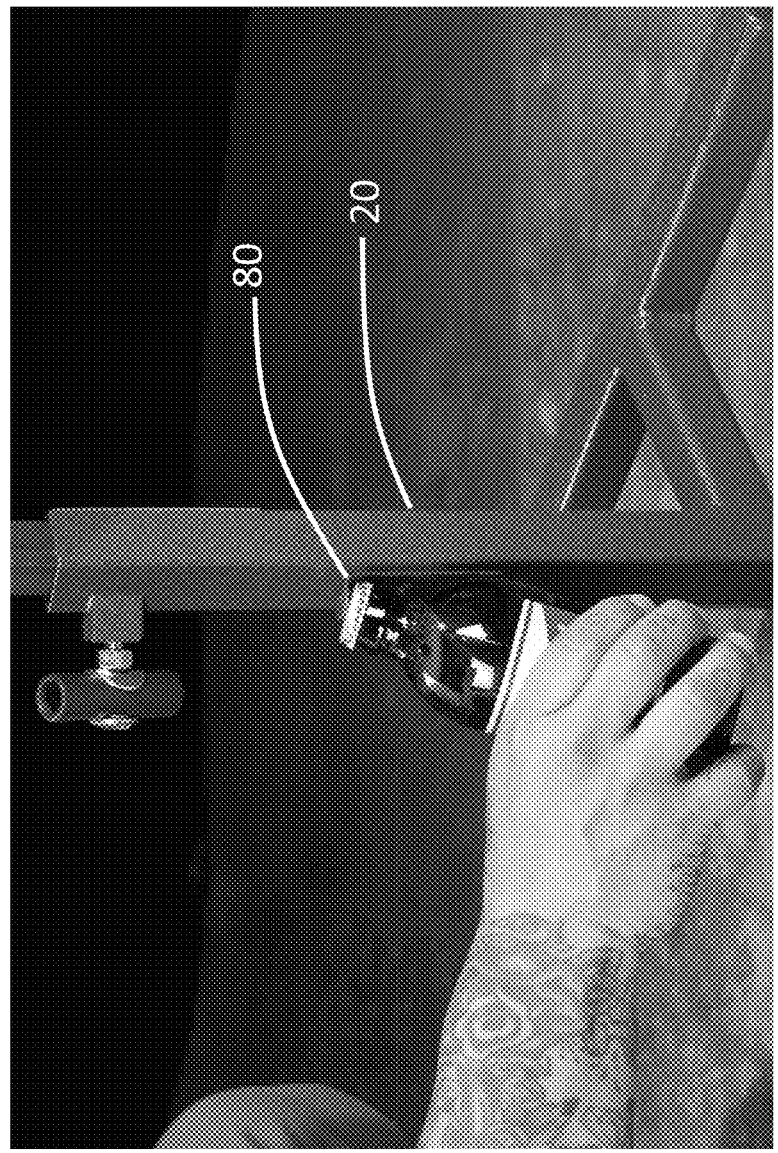
FIG. 5 shows an optional bottle opening feature of one example of a tattoo arm rest.

Referring now to FIG. 5, an optional bottle opener feature of one example of a tattoo arm rest is shown. Since the process of applying tattoos usually takes several hours, a bottle opener 80 may advantageously be welded or otherwise affixed to the rectangular vertical support column 20.

Figure 6:
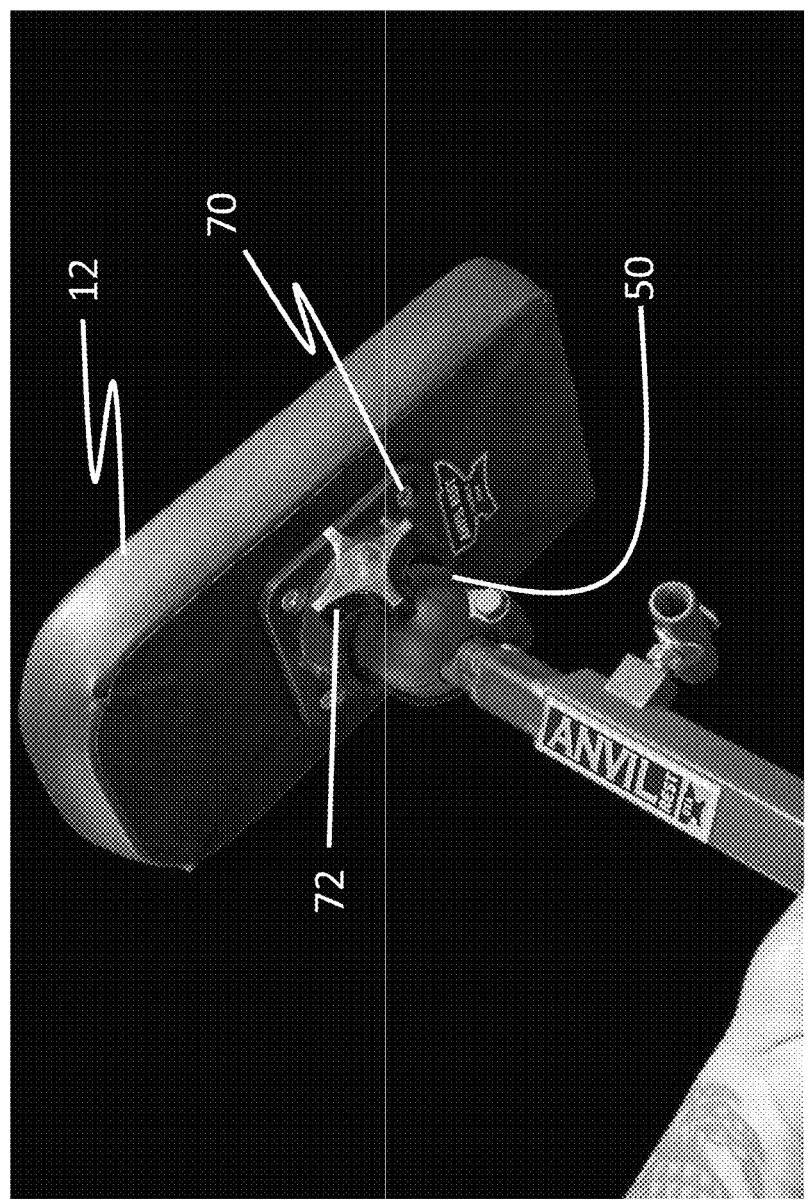
FIG. 6 shows a detailed bottom view of the vertical leg and arm rest for one example of a tattoo arm rest.

Referring now to FIG. 6, a detailed bottom view of the vertical leg and arm rest for one example of a tattoo arm rest is shown. Here it can be seen that the arm pad 12 is attached to a base plate 70 in a conventional manner. The base plate 70 includes a collar 72 sized to meet with the ball swivel assembly 50.

Figure 7:
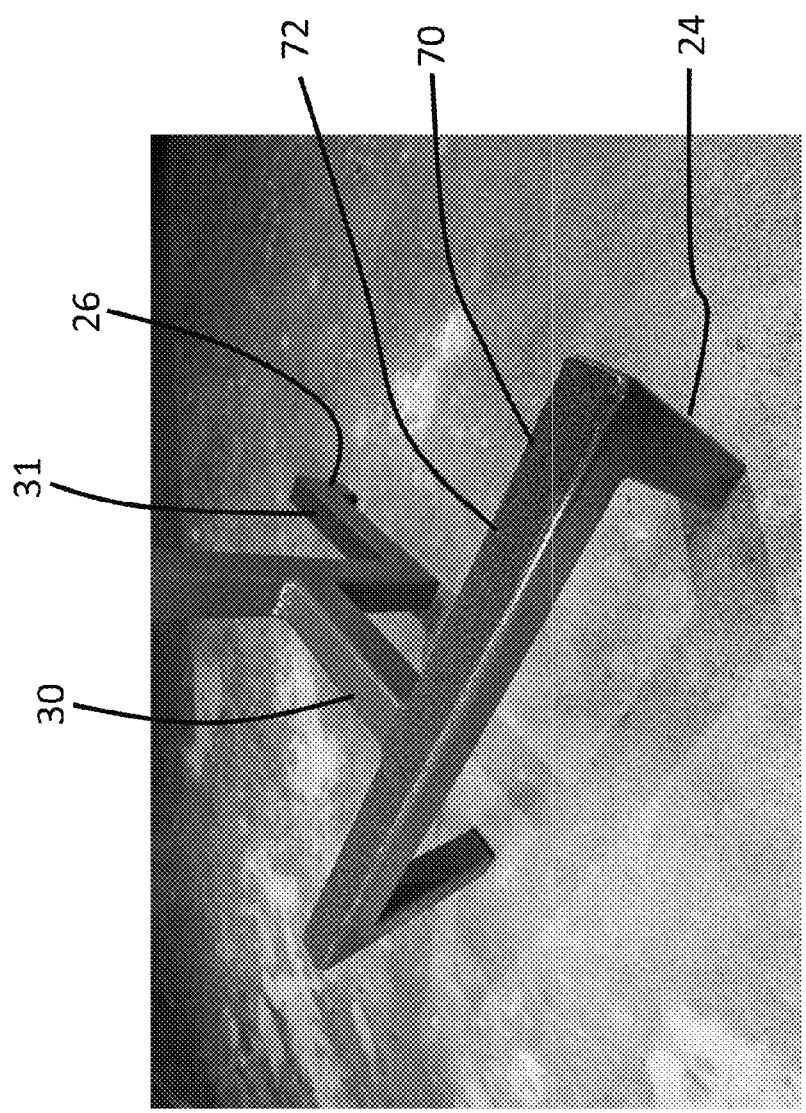
FIG. 7 shows a detailed bottom view of the foot rest integrated into one example of a tattoo arm rest.

Referring now to FIG. 7, a detailed bottom view of the foot rest integrated into one example of a tattoo arm rest is shown. As discussed above, the foot rest 22 includes a pair of opposing legs 24 and the third offset leg 26 in a tripod configuration. A horizontal member 70 provides a foot rest surface 72 which may optionally be covered by a nonslip pad or the like as discussed above. The first horizontal support member 30 is affixed between in a perpendicular relationship between the horizontal member 70 and the rectangular vertical support column 20 as by welding or the like. A second horizontal support member 31 connects the third leg 26 to the rectangular vertical support column 20.

Referring now jointly to FIG. 1-FIG. 7, in one particularly advantageous configuration the tattoo arm rest includes an arm pad 12, a ball swivel 50 coupled to the arm pad 12, wherein the arm pad 12 is mounted on a plate 70 having a collar 72 thereon for accepting the ball swivel 50. A rectangular stem support 14 is coupled to the ball swivel 50. A corner pinch vise 16 has a locking bolt 43 located to lock the rectangular stem support 14 vertically in place. The locking bolt 43 impinges upon the rectangular stem support 14 through a collar block 42 having a V-shaped groove on one end for mating with a corner of the rectangular vertical support column so as to allow the armrest to be finely positioned. The block is welded or integrated into the rectangular vertical support column 20 and the rectangular vertical support column is sized to slidingly receive the rectangular stem support 14.

In one aspect, the rectangular vertical support column 20 and rectangular stem support 14 are substantially telescoping rectangular tubes, wherein the rectangular vertical support column 20 has a wedge-shaped support 42 affixed to a corner thereto with a hole for accepting the corner pinch vise locking bolt. A bottle opener 80 may advantageously be affixed to the rectangular vertical support column 20, and the foot rest 22 may be advantageously affixed proximate the bottom of the rectangular vertical support column 20. In one example, the foot rest 22 is attached to the rectangular vertical support column 20 by a substantially perpendicular horizontal support member 30 wherein the footrest includes a non-slip top surface 60, and a plurality of support legs 24, 26 configured in a tripod arrangement and attached to the rectangular vertical support column 20.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment, and devices, and that various modifications, both as to the equipment details and operating procedures, may be accomplished without departing from the true spirit and scope of the present invention.

What is claimed is:

1. A tattoo arm rest comprising:
   an arm pad;
   a ball swivel coupled to the arm pad;
   a rectangular stem support coupled to the ball swivel;
   a corner pinch vise having a locking member located to lock the rectangular stem support vertically in place;
   a rectangular vertical support column sized to slidingly receive the stem support, wherein the rectangular vertical support column and rectangular stem support are substantially telescoping rectangular tubes, wherein the rectangular vertical support column has a support block affixed to one corner with a hole for accepting the corner pinch vise locking bolt;
   a foot rest affixed to the rectangular vertical support column; and
   a plurality of support legs configured in a tripod arrangement and attached to the rectangular vertical support column.

2. The tattoo arm rest of claim 1 wherein the foot rest is attached to the rectangular vertical support column by a substantially perpendicular horizontal support member.

3. The tattoo arm rest of claim 1 wherein the corner pinch vise comprises a threaded locking bolt which impinges upon the rectangular stem support through the support block, the block having a V-shaped groove on one end for mating with the corner of the rectangular vertical support column so as to allow the armrest to be finely positioned.

4. The tattoo arm rest of claim 1 wherein the arm pad is mounted on a plate having a collar thereon for accepting the ball swivel.

5. The tattoo arm rest of claim 1 wherein the block is welded or integrated into the vertical support column.

6. The tattoo arm rest of claim 5 further comprising a bottle opener affixed to the vertical support column.

7. The tattoo arm rest of claim 5 wherein the foot rest includes a non-slip top surface.

8. A tattoo arm rest comprising:
   an arm pad;
   a ball swivel coupled to the arm pad, wherein the arm pad is mounted on a plate having a collar thereon for accepting the ball swivel;
   a rectangular stem support coupled to the ball swivel; a corner pinch vise having a locking bolt located to lock the rectangular stem support vertically in place, wherein the corner pinch vise comprises a threaded locking bolt which impinges upon the rectangular stem support through a block having a V-shaped groove on one end for mating with a corner of the rectangular vertical support column so as to allow the armrest to be finely positioned;
   a rectangular vertical support column sized to slidingly receive the stem support, wherein the rectangular vertical support column and rectangular stem support are substantially telescoping rectangular tubes;
   a foot rest affixed to the rectangular vertical support column, wherein the foot rest is attached to the rectangular vertical support column by a substantially perpendicular horizontal support member; and
   a plurality of support legs configured in a tripod arrangement and attached to the rectangular vertical support column.

9. The tattoo arm rest of claim 8 wherein the block is welded or integrated into the vertical support column.

10. The tattoo arm rest of claim 8 further comprising a bottle opener affixed to the vertical support column.

11. The tattoo arm rest of claim 8 wherein the footrest includes a non-slip top surface.

12. A tattoo arm rest comprising:
   an arm pad, a ball swivel coupled to the arm pad, wherein the arm pad is mounted on a plate having a collar thereon for accepting the ball swivel;
   a rectangular stem support is coupled to the ball swivel;
   a rectangular vertical support column sized to slidingly receive the stem support, wherein the rectangular vertical support column and rectangular stem support are substantially telescoping rectangular tubes;
   a corner pinch vise has a locking bolt located to lock the rectangular stem support vertically in place, wherein the locking bolt impinges upon the rectangular stem support through a collar block having a V-shaped groove on one end for mating with a corner of the rectangular vertical support column so as to allow the armrest to be finely positioned and the block is welded or integrated into the rectangular vertical support column and the rectangular vertical support column is sized to slidingly receive the stem support;
   a bottle opener is affixed to the vertical support column; and
   a foot rest is affixed to the rectangular vertical support column by a substantially perpendicular horizontal support member wherein the foot rest includes a non-slip top surface, and a plurality of support legs configured in a tripod arrangement and attached to the rectangular vertical support column.

* * * * *